G. L. COLEMAN.
CHECK VALVE FOR WATER TOWERS.
APPLICATION FILED JUNE 30, 1916.
1,236,056.
Patented Aug. 7, 1917.
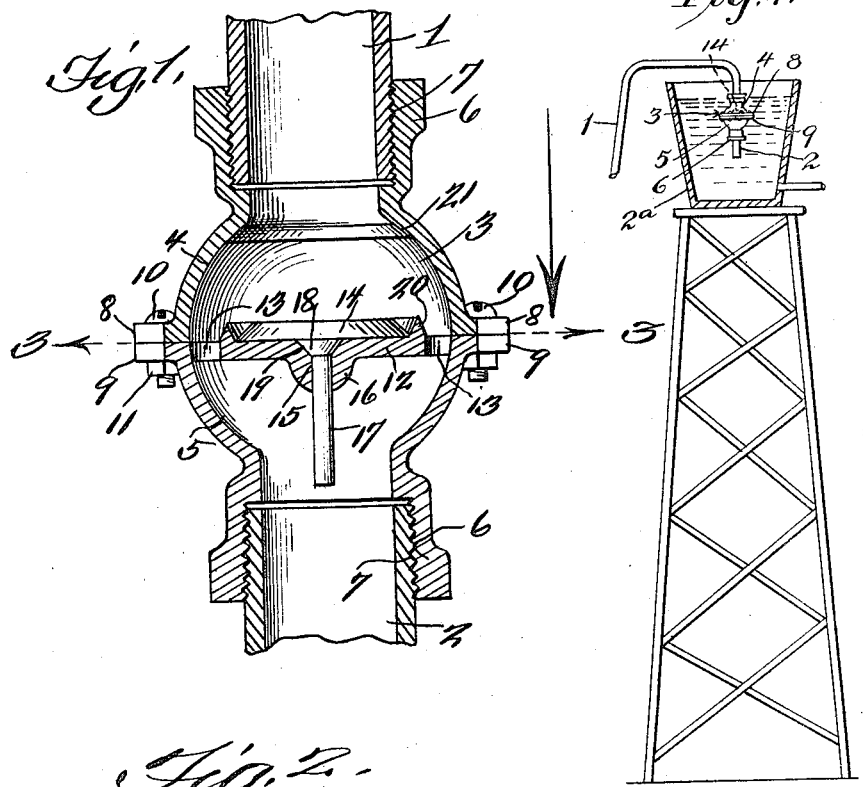
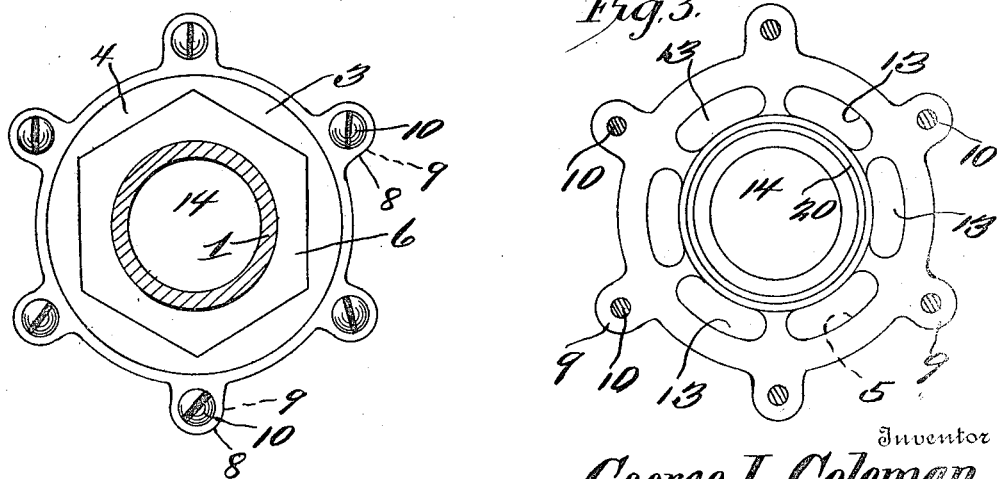
Witnesses
Frances J. Rowell,
Philip Ferrell.
Inventor
George L. Coleman,
By D. Swift & Co.,
his Attorneys

UNITED STATES PATENT OFFICE.

GEORGE L. COLEMAN, OF DUBLIN, GEORGIA.

CHECK-VALVE FOR WATER-TOWERS.

1,236,056.  Specification of Letters Patent.  Patented Aug. 7, 1917.

Application filed June 30, 1916. Serial No. 106,852.

*To all whom it may concern:*

Be it known that I, GEORGE L. COLEMAN, a citizen of the United States, residing at Dublin, in the county of Laurens, State of Georgia, have invented a new and useful Check-Valve for Water-Towers; and I do hereby declare the following to be a full, clear, and exact description of the invention, such as will enable others skilled in the art to which it appertains to make and use the same.

This invention relates to the art of water distribution, and particularly to a new and useful check valve more especially adapted for use in connection with water towers.

One of the objects of the invention is the provision of a valve of this kind which will automatically cut off the water in the tower at a certain height, by means of a float valve, designed to close against its seat in the upper wall of the valve casing, and open when the pressure in the tower below the valve is less than the pressure in the pipe above the valve.

Another object of the invention is to provide a valve of this kind which comprises simple, improved, efficient and practical features of construction.

One of the features of construction is the provision of a globe valve casing consisting of two sections, one section of which has a supporting spider and guide for the valve and its stem to support the valve member proper when not in contact with its seat, and to guide the valve toward its seat when the water in the tower rises sufficiently to float the valve toward its seat.

In practical fields the details of construction may necessitate alterations falling within the scope of what is claimed.

The invention comprises further features and combinations of parts, hereinafter set forth, shown in the drawings, and claimed.

In the drawings,

Figure 1 is a vertical sectional view through two axially disposed sections of a portion of a water tower conduit, showing the globe valve casing connecting the two sections, and the valve proper supported upon the spider and guide.

Fig. 2 is a plan view.

Fig. 3 is a view on line 3—3 of Fig. 1, showing the top section removed, and the bottom section of the globular valve casing in plan.

Fig. 4 is a view in elevation, showing the application of the valve to the inlet pipe of a tower tank.

Referring more especially to the drawings, 1 and 2 designate two axially disposed sections of a portion of a water tower, that is, two sections of a pipe or conduit.

3 denotes a globular valve casing, which consists of two sections 4 and 5, each of which is provided with an extension 6. The interiors of the extensions 6 are threaded, as shown at 7, to be engaged by the threads of the sections 1 and 2 of the pipe or conduit.

The two sections 4 and 5 of the globular valve casing are provided with radially extending ears or lugs 8 and 9, which are secured together by the bolts 10 and nuts 11.

The lower section 5 of the globular valve casing, on its interior and adjacent where it is bolted to the section 4, is provided with a spider or support 12 having a plurality of curved openings 13, which are arranged concentrically with the center of the spider 12 so that the rising water in the conduit or pipe or tower is allowed to pass above the spider in order to float the valve 14.

The spider 12 is provided with a central opening 15, which is surrounded by an enlargement 16, thereby making the guide opening 15 of greater length, so as to insure sufficient guiding action for the stem 17 of said valve.

The valve 14, where the stem 17 is constructed integrally therewith, has a beveled portion 18, which engages the correspondingly constructed beveled countersink 19 of the central opening 15.

The upper surface of the spider 12 is provided with an integral circular rib 20 V-shaped in cross section. It is to be noted that when the valve 14 gravitates toward the spider or support 12, the guide opening 15, the beveled countersink 19 and the tapering or beveled portion 18 of the stem combined with the beveled inner surface of the V-shaped rib 20, said valve is guided toward its support and within the rib concentrically.

By means of the foregoing combined guiding means, the float valve 14, when it is floated by the rising water or other fluid in said conduit, is guided concentrically toward and into engagement with its seat 21, of the upper inner wall of the upper section 4 of the globular valve casing. This valve seat 21 is constructed to fit the bevel of the float valve 14, but at the same time it is substantially a part of the curvature of the inner surface of the upper section 4 of the valve casing. In order to make the curvature of the inner surface of the upper section conform to the bevel of the float valve 14, the bevel of which is substantially at a 45° angle, said valve seat 21 is constructed very close to where the inner spherical surface of the upper section 4 of the casing terminates.

The pressure in the pipe 1 (which extends over and into the top of the tower tank 2$^a$) is just sufficient to lift the water or other fluid over the bend in said pipe. Therefore, it is to be noted that when the water in the tower tank rises to a point substantially even with or a trifle above the valve seat 21, the bouyant effect of the water in the tower tank is sufficient to float the valve 14 and close it against the seat. When the pressure of water in the tower below the valve is less than the pressure in the pipe 1 above the valve, or when the water in the tower tank reaches a level below the valve seat 21, said valve 14 will open by gravitation as a result of the water lowering.

The invention having been fully set forth, what is claimed as new and useful is:—

1. In a float check valve, the combination of two axially disposed sections of a tower conduit and a globular valve casing axially connecting said sections and having a valve seat in its upper interior surface, of a combined spider and guide on the interior of the valve casing, a float valve having a stem supported upon said spider normally, said spider having a central guide opening for the stem of the valve which guides the float valve toward its seat when the water or other fluid rises sufficiently into the valve casing, said spider having an annular rib V-shaped in cross section rising upwardly therefrom and concentric with the guide opening, whereby its inner beveled surface combined with the guide opening will guide the float valve toward its support when the valve gravitates as a result of the water lowering.

2. In a float check valve, the combination of two axially disposed sections of a tower conduit and a globular valve casing axially connecting said sections and having a valve seat in its upper interior surface, of a combined spider and guide on the interior of the valve casing, a float valve having a stem supported upon said spider normally, said spider having a central guide opening for the stem of the valve which guides the float valve toward its seat when the water or other fluid rises sufficiently into the valve casing, said spider having an annular rib V-shaped in cross section rising upwardly therefrom and concentric with the guide opening, whereby its inner beveled surface combined with the guide opening will guide the float valve toward its support when the valve gravitates as a result of the water lowering, said valve casing consisting of two sections, the adjacent faces of the sections having radial lugs or ears, bolts extending through said ears or lugs, thereby securing the two sections of the valve casing together, said spider having a plurality of openings beyond the rib and being concentric with the center of the spider through which the water as it rises passes.

In testimony whereof I have signed my name to this specification in the presence of two subscribing witnesses.

GEORGE L. COLEMAN.

Witnesses:
W. R. WERDEN,
J. B. GREEN.